May 22, 1923.

H. W. SLAUSON

INDICATOR

Filed May 24, 1920    2 Sheets-Sheet 1

INVENTOR.
H. W. Slauson.

BY

Gordon and Stewart
ATTORNEYS

INVENTOR.
H. W. Slauson.
BY
Gordon and Stewart
ATTORNEYS

Patented May 22, 1923.

1,456,155

UNITED STATES PATENT OFFICE.

HAROLD WHITING SLAUSON, OF NEW YORK, N. Y.

INDICATOR.

Application filed May 24, 1920. Serial No. 383,834.

*To all whom it may concern:*

Be it known that I, HAROLD WHITING SLAUSON, a citizen of the United States, residing at New York, in the county of New York and State of New York, have invented certain new Improvements in Indicators, of which the following is a specification.

This invention relates to indicators and more particularly to devices for indicating the quantity of a force incident to the motion of a vehicle and dependent on at least two variable quantities, one of which is the quantity of inclination of the vehicle relative to the horizontal. It has as one of its objects the provision of a simple and effective means for indicating the quantity of the resultant variable property at all times as component quantities, which determine the quantity of the resultant force, vary, thus facilitating, for instance, the comparison of the horsepower necessary to maintain an automobile at a given speed on a given grade with that necessary to maintain the same automobile at various other speeds on various grades.

Another object is the provision of a device of this kind which will indicate the value of at least one of the variable component quantities and a still further object is the provision of a device of this kind which may be readily adjusted to adapt it for use with various vehicles to suit one constant quantity of the particular vehicle which is a component of the resultant force indicated.

Other objects of the invention and the features of novelty will be apparent from the following specification when taken in connection with the accompanying drawings in which:—

Figure 1:
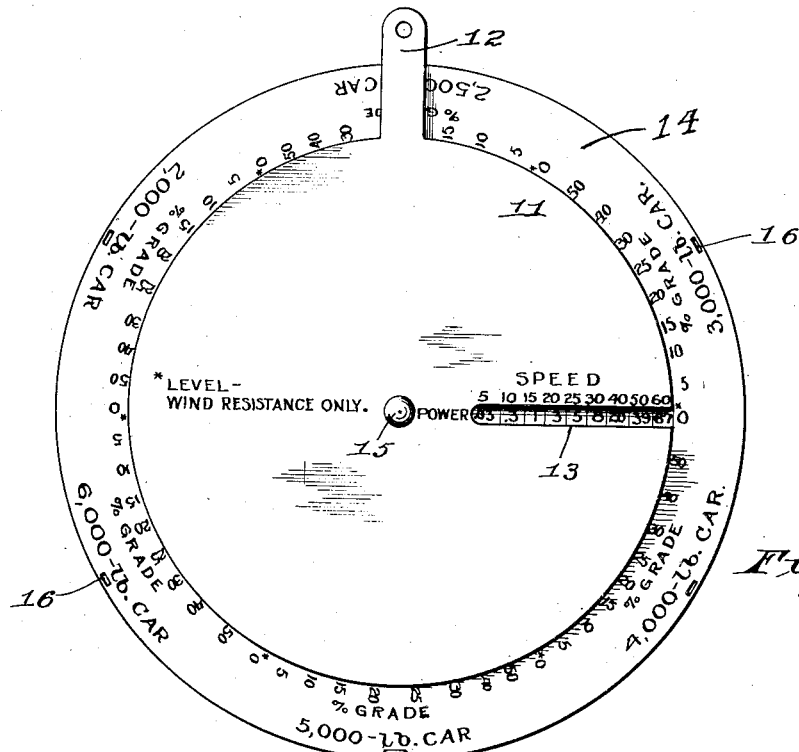
Figure 1 is a view in elevation of a device embodying my invention.
Figure 2:
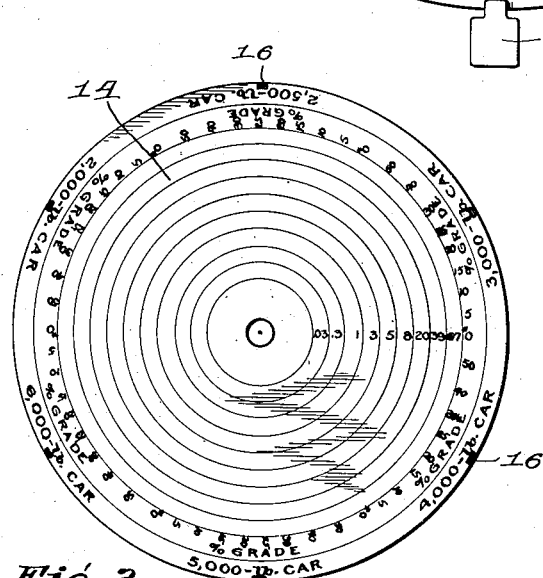
Figs. 2 and 3 are respectively views in elevation of parts of the structure shown in Fig. 1.
Figure 3:
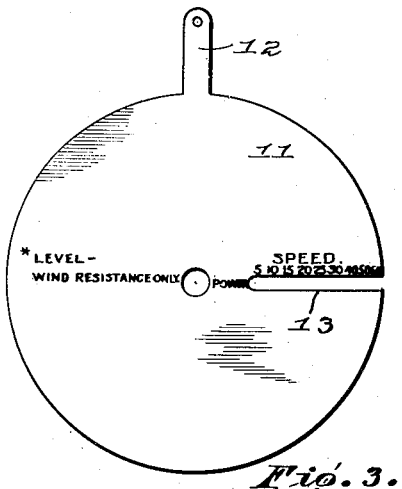

In the various structures illustrated I have shown my invention as embodied in indicators for facilitating comparison of the horse power being developed to maintain the speed of a conveyance such as an automobile or aeroplane under varying conditions of speed and inclination relative to the horizontal, the structure shown in Figs. 1 to 3 being shown as adaptable to vehicles of different weights. It will be apparent, however, that indicia representing another resultant quantity than horsepower may be used, and that the various parts may be relatively movable in response to changes in other variable component quantities than those of speed and inclination.

In the modification shown in Figures 1, 2 and 3 a dial 11 is provided which has a perforated lug 12 by which it may be rigidly and removably secured to the body of a moving vehicle, with the plane of the dial substantially vertical and parallel to the direction of motion of the vehicle. A sight opening 13 is formed in the dial 11, preferably extending radially inwardly from its forward edge, and adjacent the opening 13 numerals representing speed are displayed, preferably increasing in order from left to right as shown. A second dial 14 is arranged adjacent to the dial 11 and mounted for pivotal movement relative thereto about pin 15 which passes through both dials. Adjacent its edge the dial 14 is formed with a plurality of circumferentially spaced openings 16 to provide for the attachment of a weight 17 in various positions relative to the dial. Since the dial 14 is freely movable in a vertical plane it will assume a different position for each point of attachment of the weight 17 and will be maintained in such position by force of gravity, so that as the vehicle changes its inclination, the dial 11 will move relatively to the dial 14, and the opening 13 will sweep over a sector of the dial 14. Adjacent the edge of the dial 14 sets of indicia, representing grade or longitudinal inclination, are displayed, the indicia of any set being arranged to register successively with the end of the opening 13 or some other suitable reading point, to indicate the inclination at any particular time, such indicia preferably representing grade in per cent as shown.

On the dial 14 numerals indicating horse-power are arranged to correspond radially with their grade components and circumferentially with their speed components, so that when the car to which the indicator is attached is moving up a given grade those numerals which represent the horse-power necessary for maintaining the car on that grade at various speeds will be in view at the opening 13 and in registry with the numerals which indicate the various speeds. The numerals indicating horse-power are different in the different sectors, to correspond with different values of a constant factor, such as the weight of the moving body, and the disc 14 is provided, adjacent each of the openings 16 with a suitable inscription indicating the constant factor involved in that series of computed results which is brought into registry with the opening 13 for any given position of the weight 17. The horsepower is dependent directly upon the quantity of force applied, and this force is a function of the variable quantities of speed and inclination of the path and constant quantities of weight (the product of the mass and the force of gravity), wind resistance and friction. For any given type of vehicle, the constant quantities being known, the horse-power necessary to maintain it at various speeds on various grades, may be mathematically determined according to well known physical laws. It will also be evident that the horsepower necessary for various speeds and grades may be empirically determined by driving an automobile on a given grade at a constant speed and measuring the horsepower developed.

In use the indicator is secured to the automobile or other moving body, and the weight 17 is secured in the proper opening 16. The speed, as indicated by a speedometer, is noted, and that numeral which is visible through the opening 13 in registry with the speed noted, indicates the horse-power for such body for the existing speed and grade. It will be understood that the numerals indicating horsepower and grade indicia may, if desired, be arranged on the member which is fixed to the body, a disc having a sight opening therein, or an index arm, being mounted so as to be responsive to terrestrial gravitation to indicate the various sets of numerals indicating horse-power applicable for the various grades.

Figure 4:
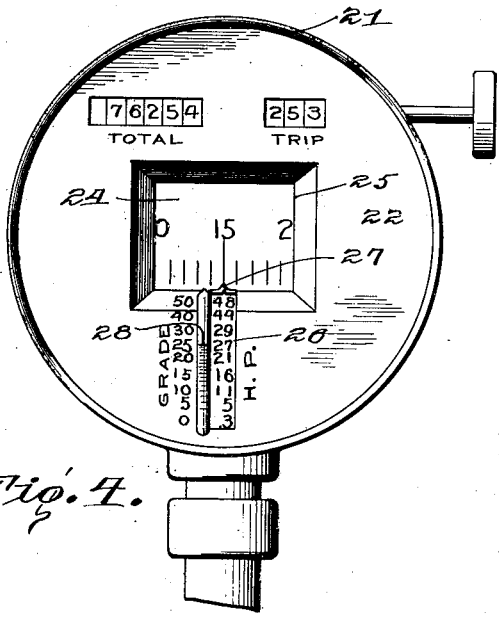
Figs. 4 and 5 are respectively a front elevation and a side elevation, partly in section, of a modified structure embodying my invention.
Figure 5:
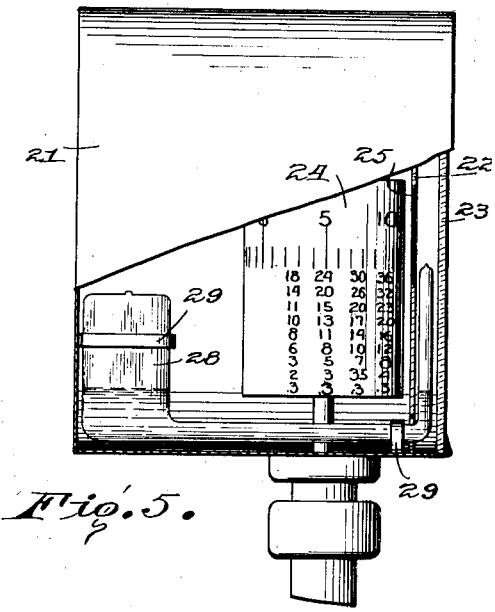

Figures 4 and 5 illustrate a modified structure in which my invention is applied to a speedometer of familiar type, comprising a casing 21 which has an opening at one end closed by a dial 22 and a transparent face plate 23. A cylindrical dial 24, is rotatably mounted in the casing 21 and surrounds suitable operating mechanism of any approved form by which the dial is moved about a substantially vertical axis in response to changes of speed, the numerals which indicate the speed being visible through a reading opening 25 in the dial 22. Another reading opening 26, or a downward extension of the opening 25, is formed in the dial 22, to permit a view of a circumferentially limited portion of the dial 24, preferably immediately below the reading point 27. Numerals representing horse-power are arranged on the dial 24 to correspond vertically with the various numerals which represent speed and to correspond horizontally with various grades, and numerals representing the various grades are arranged on the dial 22 adjacent the opening 26. A spirit level 28 is suitably secured in position in the casing 21 as shown at 29, the one end of the level being bent upwardly between the dial 22 and the face plate 23 adjacent the opening 26, so that the height of the liquid therein will indicate the grade and the corresponding numeral on the dial 24 which represents the horse-power for the corresponding grade and speed.

Figure 6:
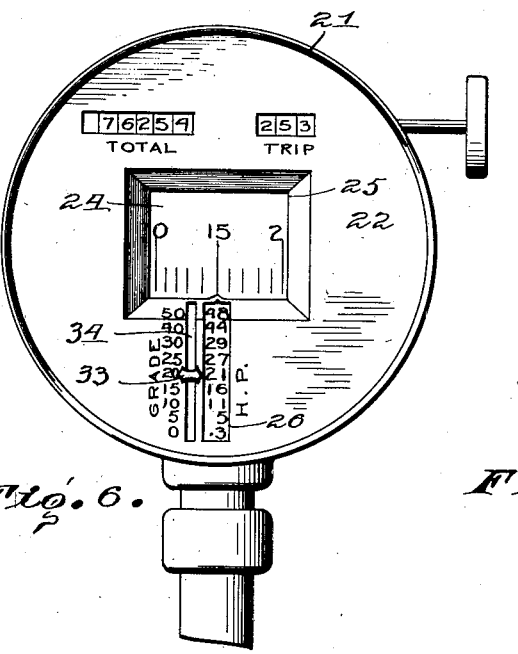
Figs. 6 and 7 are respectively a front elevation and a side elevation, partly in section, of another modified structure embodying my invention.
Figure 7:
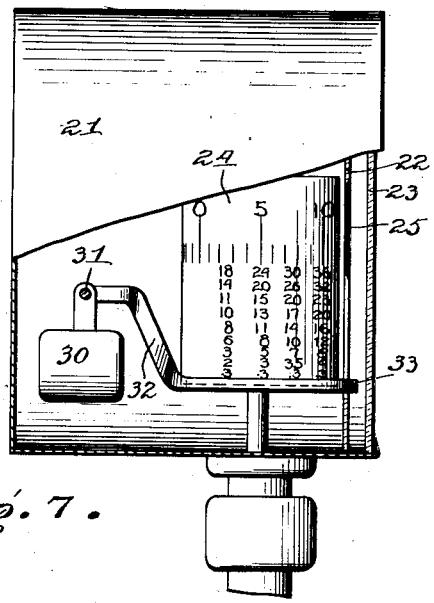

Figures 6 and 7 illustrate a modified structure similar to that shown in Figures 4 and 5, the spirit level being replaced by a pendulum 30 which is pivotally mounted on the transversely extending pin 31 for movement relative to the casing 21. An arm 32 is rigid with the pendulum 30 and extends around the dial 24, the forward end 33 of such arm extending through an opening 34 in the dial 22 adjacent the opening 26. The pendulum 30 and the arm 32 will maintain their position relative to the earth, so that the position of the end 33 of the arm 32 relative to the dial 22 will indicate the grade and that numeral on the dial 24 which represents the horse-power for the corresponding grade and speed.

In any of the modifications shown the indicia may be arranged to indicate down grade, if desired, or to indicate both up and down grade. The numerals or other resultant indicia upon the dials 14 or 24 may, if desired, indicate the braking effort necessary to stop the automobile in a given distance, it being evident that the quantity of such force is a function of the variable quantities of speed and inclination and the constant quantities of weight, wind resistance and friction, and can be determined according to well known physical laws, or by trial and measurement.

While several embodiments of the invention have been herein shown and described, it will be understood that the invention may be utilized for comparison of other variable quantities of forces incident to the motion of a vehicle than those described, and that various changes may be made in the arrangement of the parts without departing from the spirit of the invention which is defined in the following claims.

Having thus described my invention, what I claim is:

1. A device for indicating the magnitude of a resultant quantity incident to the motion of a vehicle which is a function of the inclination of the path of motion of the vehicle and another variable quantity, comprising a member carried by the vehicle and responsive to the force of gravity, and a member carried by the vehicle and movable relative to said first mentioned member in response to changes of inclination of said vehicle, one of said members having thereon a series of resultant indicia of which inclination and another variable quantity are factors arranged to correspond in one direction with their inclination components and in another direction with their other variable quantity components, and the other of said members having indicia thereon representing said other variable quantity components arranged to register with the resultant indicia of which they are factors.

2. A device for indicating the magnitude of a resultant quantity incident to the motion of a vehicle comprising a member having thereon a plurality of series of resultant indicia, the indicia in each of said series being a function of a constant component quantity which varies with various vehicles, the resultant indicia in each series being arranged to correspond in one direction with inclination components and in another direction with other variable quantity components, and a member having thereon indicia representing said other variable quantity components, one of said members being adapted for rigid attachment to said vehicle and the other of said members being movable relative to said body and responsive to the force of gravity, the relative position of said members being selectively adjustable to bring the various series of resultant indicia on the one member into position adjacent the indicia on the other member.

3. A device for indicating the magnitude of a resultant quantity incident to the motion of a vehicle which is a function of inclination relative to the horizontal, comprising a member adapted to be rigidly attached to the vehicle and having thereon a plurality of series of indicia representing the resultant quantity, a second member pivotally mounted adjacent said first member and having a reading line, and a weight selectively cooperating with various portions of said second member to cause it to maintain various positions relative to the horizontal and thereby bring the various series of indicia into position adjacent said reading line.

4. A device for indicating the inclination of a moving body relative to the horizontal and a resultant quantity of which the inclination and another variable quantity are factors, comprising a member carried by said body and responsive to terrestrial gravitation to maintain a constant position relative to the horizontal, and a member rigid with said moving body and movable therewith relative to said means in response to changes in inclination of said body, one of said members having a reading line and indicia representing the other variable quantity adjacent thereto, and the other having indicia representing inclination and a series of resultant indicia so arranged that those having the same inclination component register with the reading line at the same time.

5. In an indicator, the combination of a member having thereon indicia representing speed, and a member having thereon indicia representing inclination and indicia representing a quantity variable with speed and inclination, one of said members being movable relative to the other in response to changes in inclination.

6. In an indicator, the combination of a dial having thereon a series of resultant indicia arranged in one direction to correspond with inclination components and in another direction to correspond with another set of components, and a dial having a window therein and said other set of components adjacent thereto, one of said dials being movable relatively to the other and responsive to changes in inclination to bring the various groups of resultant indicia into view in registry with their components of the other set.

7. A device for indicating the magnitude of a resultant quantity incident to the motion of vehicle which is a function of its speed and inclination relative to the horizontal, comprising a member having thereon a series of resultant indicia arranged in one direction to correspond with their speed components and in another direction with their inclination components, and a second member adjacent said first member, one of said members being rigid with the moving body, means for moving the other of said members in response to changes of speed of the body to indicate the group of resultant indicia corresponding to a given speed component, and means responsive to changes of inclination of the body to indicate that computed result in the group which corresponds to a given inclination.

8. A device for indicating the magnitude of a resultant quantity incident to the motion of a vehicle which is a function of speed and inclination relative to the horizontal, comprising a housing rigid with said body and having a sight opening, a member mounted in said housing and having thereon a series of resultant indicia arranged to correspond in one direction with their speed components and in another direction with their inclination components, said member being movable in one direction relative to said sight opening in response to changes of speed, and means responsive to terrestrial gravitation to maintain its position relative to the horizontal and movable in another direction relative to said sight opening.

In testimony whereof I have hereunto set my hand.

HAROLD WHITING SLAUSON.